US007487912B2

(12) United States Patent  
Seifert et al.

(10) Patent No.: US 7,487,912 B2
(45) Date of Patent: Feb. 10, 2009

(54) ELECTRONIC RECEIPTING

(75) Inventors: Dean Seifert, Dublin (IE); Tim Keane, Dublin (IE)

(73) Assignees: First Data Corporation, Greenwood Village, CO (US); The Western Union Company, Englewood, CO (US)

(*) Notice: Subject to any disclaimer, the term of this patent is extended or adjusted under 35 U.S.C. 154(b) by 108 days.

(21) Appl. No.: 11/238,813

(22) Filed: Sep. 28, 2005

(65) Prior Publication Data

US 2007/0069013 A1    Mar. 29, 2007

(51) Int. Cl.
*G06K 5/00* (2006.01)

(52) U.S. Cl. .......................................... 235/380; 705/39
(58) Field of Classification Search ................. 235/380; 705/16, 24, 26, 27, 39
See application file for complete search history.

(56) References Cited

U.S. PATENT DOCUMENTS

| | | | |
|---|---|---|---|
| 5,739,512 A * | 4/1998 | Tognazzini ................. 235/380 |
| 6,067,529 A * | 5/2000 | Ray et al. ..................... 705/26 |
| 6,341,353 B1 * | 1/2002 | Herman et al. ................. 726/5 |
| 6,827,260 B2 | 12/2004 | Stoutenburg et al. |
| 6,886,742 B2 | 5/2005 | Stoutenburg et al. |
| 6,975,856 B2 | 12/2005 | Ogasawara |
| 2002/0002519 A1 | 1/2002 | Kosuda et al. |
| 2002/0077974 A1 * | 6/2002 | Ortiz ............................ 705/39 |
| 2003/0055733 A1 * | 3/2003 | Marshall et al. ............... 705/24 |
| 2003/0126020 A1 * | 7/2003 | Smith et al. .................... 705/21 |
| 2003/0217005 A1 | 11/2003 | Drummond et al. |
| 2004/0039702 A1 | 2/2004 | Blair et al. |
| 2004/0078327 A1 | 4/2004 | Frazier et al. |
| 2004/0020964 A1 | 11/2004 | Shiftan et al. |
| 2004/0220964 A1 * | 11/2004 | Shiftan et al. ........... 707/103 R |
| 2004/0225567 A1 * | 11/2004 | Mitchell et al. ................ 705/16 |
| 2004/0235450 A1 * | 11/2004 | Rosenberg .................. 455/406 |
| 2005/0010505 A1 | 1/2005 | Darrell |

* cited by examiner

*Primary Examiner*—Daniel A Hess
(74) *Attorney, Agent, or Firm*—Townsend and Townsend and Crew LLP

(57) ABSTRACT

Certain embodiments of the present invention provide systems and methods for receipting transactions transacted at a POS device. More specifically, but not by of limitation, embodiments of the present invention provide methods and systems for electronically receipting POS transactions and, in some embodiments, of providing the electronic receipts to a destination selected by a party to the POS transaction.

38 Claims, 7 Drawing Sheets

ELECTRONIC RECEIPTING

CROSS-REFERENCE TO RELATED APPLICATIONS

This application is related to co-pending U.S. patent application Ser. No. 11/132,521, filed on May 18, 2005, filed by Gupta Tulluri and entitled "Automated Teller Machine With Receipt Printer And Display," the disclosure of which is incorporated herein by reference for all purposes.

BACKGROUND OF THE INVENTION

Embodiments of this invention relate generally to the field of receipts, and in particular with options for receiving receipts. More specifically, but not by way of limitation, embodiments of the present invention provide methods and systems for electronic receipting of point-of-sale transactions.

Point-of-sale ("POS") devices are widely used throughout the world. With most POS devices, after performing a transaction, a paper receipt is automatically generated for a customer. Often, however, the customer discards these receipts prior to using/down-loading the recorded information. Therefore, the receipts account for a significant amount of wasted paper and may serve no actual purpose since the information recorded on the receipt may be lost to the customer. Further, even for customers who may desire to utilize receipts to keep records of POS transactions and/or for return purposes, the receipts—because of the size and/or composition of the receipts, the inconvenience of transferring data from the receipt to a recording system, and/or the like—may not provide for accurate and/or convenient recordation of POS transactions.

Another issue with receiving receipts from a POS device is that they are typically merchant specified. In other words, the merchant dictates what is on the receipt, which in turn is often dictated by the specific equipment used to generate the receipt at the point of sale. For instance, a typical paper receipt from a restaurant may include the date of the transaction and the transaction amount. This may pose problems for those wanting to electronically capture and process transaction data as line item detail, and may require significant transformation or pre-processing of the data, if it exists at all.

BRIEF SUMMARY OF THE INVENTION

In certain embodiments, the invention provides systems and methods that provide a person with options for receiving receipts, electronic or otherwise. For example, when using a receipt processor having a display screen and an input device, the customer may be shown a variety of receipting options on the display screen. These options could include a paper receipt printed using a printer associated with the receipt processor, a display of the receipt on the display screen, an electronic copy of the receipt, or a combination of any of these options. For electronic copies, the receipt processor may be used in combination with a transmitter to transmit a signal that allows the receipt to be sent to an email account or address, a wireless communications device, such as a mobile phone, PDA, a smart card, wireless email device or the like. In doing so, a variety of formats may be used, such as an SMS text message, a pdf file, a spreadsheet, or the like. Additionally, new formats may be developed for use with the receipt processor. Electronic receipts are advantageous in that paper is not used, thereby conserving an important natural resource. Further, with electronic receipts information is recorded in a nontangible means that may be easily manipulated, easily transferred to different recording and storage devices to protect against loss of the receipt information, and easily downloaded to software programs, such as Quickens or the like, for processing.

According to one feature, the customer may negotiate at the POS device as to what type of data should be included on the receipt as well as the format of the data, among other items. For example, the customer may manually operate the POS device or communicate with it via a consumer device, such as a PDA, cell phone or other wireless device. In this negotiation process, the customer may specify the required information items and formats to be included on the receipt. In response, the POS device may provide a confirmation that the requested data/formats are available, may suggest other formats or indicate such options are not available. This process enables the merchant to produce customized receipts on demand (from the customer device) to facilitate direct input to downstream accounting and/or reporting activities. This may also be used to automate other processes, such as statutory filings, including VAT returns.

In some embodiments, the customer may pre-register for a given option so that each time a receipt is to be generated, it is provided according to the selected option. Pre-registering may be done by contacting a service center, by contacting a merchant, by contacting a service provider, by uploading the information from a POS device or associated device, and/or the like.

A wide variety of processors, applications, machines or the like may be configured with POS devices to provide various types of electronic receipts. In some embodiments, an electronic receipting machine for use with a POS device may include a processor, a communication device for receiving data from the POS device, an input device for receiving receipting instructions from the POS device, and a transmitting device. Additionally, in some embodiments, a display screen may be used to, among other things, display the various receipting options, and the input device may be used to select one or more of the options. Depending on the selected option, a printer may be used to print a paper receipt, or the transmitting device may be used to transmit a signal to a host computer, switch, computer network or the like, in order to provide an electronic copy of the receipt to a wireless phone, email address, PDA, or the like. In some cases, the transmitting device may transmit or "beam" the electronic receipt directly to a wireless device using a variety of technologies, such as Blue Tooth, infrared, wi-fi, wi-max, etc., so that the customer can instantly receive a copy of the receipt. In other cases, the customer could connect a portable device to the receipting machine or a device associated with the POS device to receive the receipt, such as by a USB connection.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
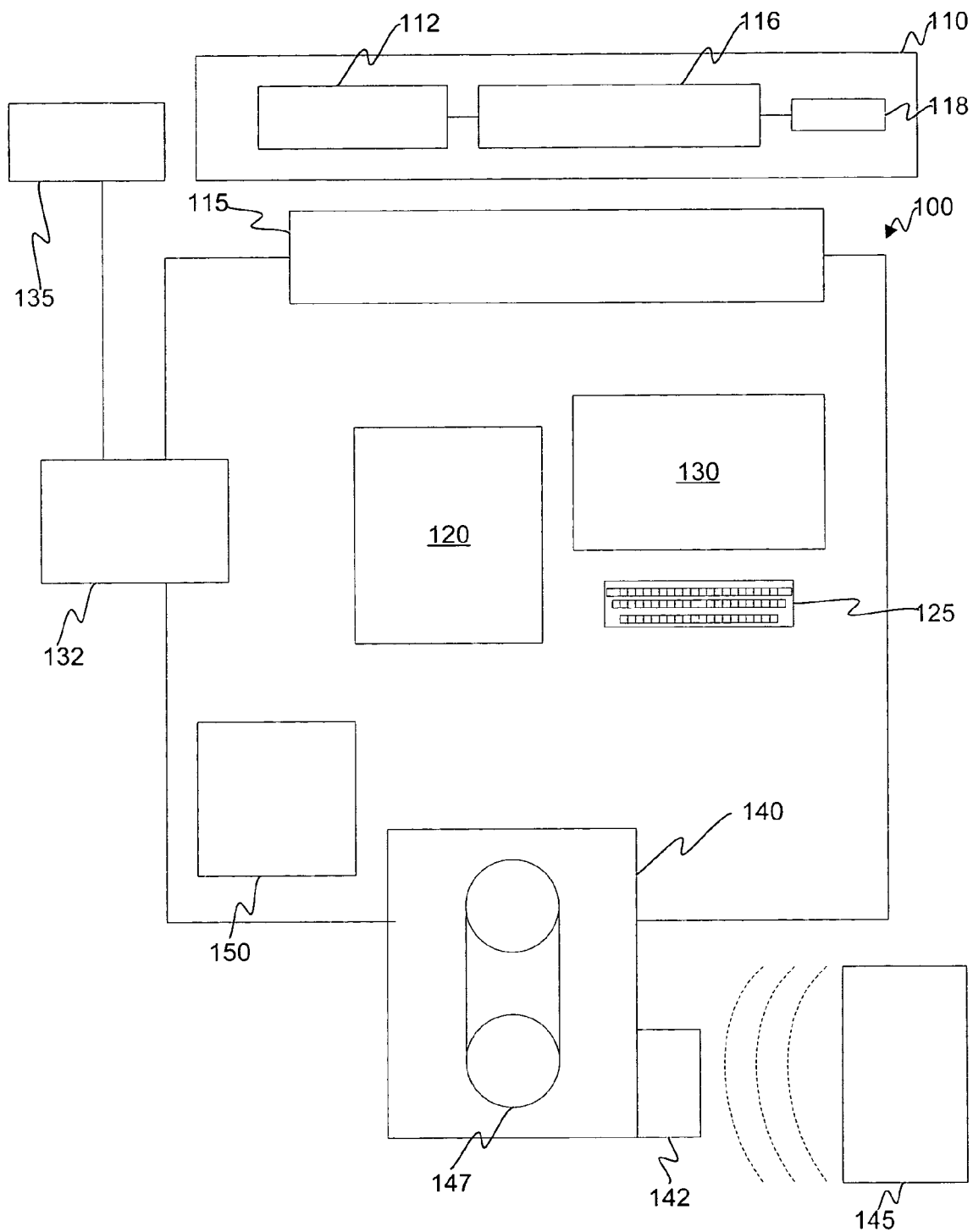
FIG. 1 illustrates an electronic receipting system in accordance with an embodiment of the present invention.

Embodiments of the present invention provide systems and methods for receipting transactions transacted at a POS device. More specifically, but not by of limitation, embodiments of the present invention provide methods and systems for electronically receipting POS transactions and, in some embodiments, for providing the electronic receipts to a destination selected by a party to the POS transaction.

The POS transactions may include transactions for goods or services or combinations thereof. In a POS transaction, a purchaser of the goods and/or the services in the POS transaction, an agent of the purchaser or a person associated with the purchaser, collectively referred to hereinafter as a customer, may make a payment to a seller of the goods and services and the payment may be processed and/or recorded using the POS device. POS devices are known in the art and examples are described in U.S. Pat. Nos. 6,886,742 and 6,827,260, the complete disclosures of which are incorporated herein by reference.

In certain aspects of the invention, the customer is given multiple options for receiving a receipt for the POS transaction. In this way, the user can receive a traditional paper receipt or other form, such as an electronic receipt that may be delivered to an email account, a wireless device, a smart card, or the like. One example of how to wirelessly transmit electronic receipts is described in co-pending U.S. patent application Ser. No. 10/273,436, filed Oct. 16, 2002, the complete disclosure of which is herein incorporated by reference. The customer may select the receipt options at the POS device, or may pre-register prior to making a transaction such that the desired electronic receipt is automatically generated.

In one option, the customer may be involved in dictating how the receipt should be formatted and what data it might include. This could be accomplished in a pre-registration process, or at the time of sale. If at the point of purchase, various options are available. For example, the customer may manually interact with the POS device, such as by keying in data or touching a touch screen, to indicate what data should be included on the receipt, the format of the data to be displayed, and the like.

As another option, the customer may electronically negotiate with the POS device as to the required data and formats. For instance, the customer may use a PDA, cell phone, or similar device and communicate with the POS device using industry standard transport protocols, such as HTTP, Bluetooth, and the like, as well as standard data description protocols, such as XML.

When negotiating with the POS device, a variety of handshakes/interactions may occur. For example, when the customer device initially communicates with the POS device, a check may be performed to see if the POS device is configured to generate an electronic receipt and/or if it is configured to communicate such requests to the customer device. If so, a confirmation may be sent back to the customer device. Once a proper communication channel is established, the customer may specify the desired data set and transmit that request to the POS device. In return, the POS device may send a message either confirming compliance with the data set request, or specify non-compliant terms. In some cases, an alternative may be suggested to the customer device. If needed, the customer may specify a revised data set and transmit that to the POS device. If in compliance, the POS device sends a confirmation to the customer device. In a similar manner, the customer device may be used to specify data formats or the style of the data to be included on the receipt.

Once the POS device is provided with all the information regarding the requested data, formats, style and the like, it may generate the receipt and transmit the electronic receipt to the desired destination. In some cases, the POS device may transmit the data and the requested format to a host computer which generates the receipt. Optionally, the consumer device may confirm the receipt of the data.

A wide variety of data set items may be requested by the customer and supported by the receipting system. Merely by way of example, such data may include the date and time of purchase, an order reference number or job number, an account code, a merchant name, a merchant address, a VAT or tax ID number, a product code, the type of goods, a description of goods, a VAT category, a unit price, a quantity, the value of the item, the type of currency, subtotals, VAT, gross amounts and the like.

In some cases, the format and/or codes may be industry standard, or may be specified based on the needs of a customer. For example, if a purchase is part of a travel and entertainment business expense, the customer's accounting department may require a certain code or require the receipt to be categorized in a certain way. The customer may negotiate for this type of receipt so that when it is received electronically, the customer may simply electronically attach it to an expense report. Then, the accounting department may easily input the requested data into their existing system for easy and efficient reimbursement and/or auditing.

A further example in the field of business expense management is the consolidation and accounting for employee expenses on a monthly basis. The consumer device may be configured to electronically capture "inline" various data items, such as VAT code, category of goods/service (according to standard industry designations), amount, and other line item details, to facilitate greater automation and cost reductions. For instance, when the business traveller gets back to the office, the data may be receipted into a desktop application that attaches appropriate cost centers, budget categories, GL codes and may present it in an appropriate form to the accounting department for processing. Also, the system may include dynamic reporting which enables budget owners to see a current picture of expenditure by employee/type of goods, and the like.

FIG. 1 illustrates an example of an electronic receipting system according to an embodiment of the invention that may be used to provide multiple options for receiving a receipt. The receipting system 100 is presented as an illustration only, and this example should not be considered limiting. In light of the disclosure herein, many other examples of the receipting system according to the present invention may be apparent to those skilled in the art, as well as other types of receipt-producing machines. Further, as illustrated in FIG. 1, the receipting system 100 is configured to communicate with a POS device 110. The POS device 110 may comprise a cash register 116, a card reader 112, a scanner 118 that may be used to scan purchases etc., and/or the like. The components of the POS device 110 may each or in combination provide transaction information to the receipting system 100. In some cases, the POS device may comprise a personal computer, such as a home PC used to make Internet purchases, or other computing system.

In practice, as may be appreciated by those skilled in the art, the receipting system 100 may share components and/or be integrated with the POS device 110 and/or other devices associated with the POS device 110. Merely by way of example, a processor 120 in the receipting system 100 may be a processor common to both the receipting system 100 and the POS device 110 or may be a software program configured to run on a processor associated with the POS device 110, and a printer 150 may be a receipt printer configured with the POS device.

The receipting system 100 may include a communication device 115 configured to provide for communication between the receipting system 100 and the POS device 110. Communication device 115 may be a network port, a USB port, a data port, an inter-processor connection port, and/or the like. The receipting system 100 may receive data from the POS device 110 via the communication device 115. Data may include information concerning transactions transacted using the POS device 110. Merely by way of example, the data may include payment information such as amount and type of payment, good or service provided or to be provided by the seller and/or a party associated with the seller, and/or the like. In certain embodiments, the transaction data may be an electronic receipt created by the POS device.

In various embodiments of the present invention, the processor 120 may receive the transaction data from the communication device 115. In some embodiments, the processor 120 may be a software program running on a processor associated with the POS 110 and the transaction data may be provided from other software applications and/or the like running on the POS processor and/or associated processors. In certain aspects, the processor 120 may be associated with a memory for storing the transaction data.

In some embodiments of the present invention, the processor 120 may be in communication with an input device 125. The input device 125 may be a keyboard, a keypad, a touch screen and/or the like that allows the customer to input a selection of a type of receipt and/or a delivery destination for the selected type of receipt. The customer may input a receipt selection and/or a delivery destination by touching buttons displayed on the screen, using keys on the keypad, using keys on the keyboard, and/or the like. The keypad and/or the keyboard may contain both numbers, letters and/or special purpose buttons for selecting functions. In some cases, the input device may comprise a presentation instrument reader, such as a magnetic stripe reader, barcode reader, RFID reader or the like. The presentation instrument has stored thereon information used to access a database containing the preferred receipt options, or in some cases, the presentation instrument itself could include the receipt preferences. In one aspect, the customer's receipt preferences may be input from a mobile transmission device that communicates with the POS device or some other form of input. This may be done, for example, by using Blue Tooth or wireless technology. In some cases, the payment instrument itself, such as a credit card, debit card, ATM card, smart card, mobile phone, PDA, or the like could include the receipt preferences which may be transmitted to the receipt system. As an alternative, the payment instrument could include information used to access a database that in turn includes such preferences.

The receipting system 100 may also include a display screen 130. The display screen 130 may be capable of communicating with the processor 120 and/or the input device 125. In certain embodiments, the input device 125 and the display screen 130 may comprise a single device, such as a touch-screen or the like. In certain aspects, the display screen 130 may be used to provide a visual receipt to the customer. In some embodiments of the present invention, the display screen 130 may display the receipting options available to the customer and provide instructions for requesting one or more of the different receipting options.

In certain embodiments, the display screen 130 may provide instructions to the customer for providing rules to a host computer 135. Thus, the customer may use the display screen 130, the input device 125, the processor 120 and/or a host computer communication port 132 to establish rules with the host computer 135 regarding the type of receipt the customer desires for different transactions. Merely by way of example, the host computer 135 may be capable of communicating with a plurality of POS devices associated with a particular seller and the customer may instruct the host computer 135 to provide receipts according to the rules whenever the customer is identified as entering a transaction by one of the POS devices without prompting from the customer. The customer may be identified by the POS devices, for example, by a credit card, debit card, smart card, store card, pin number, Blue Tooth or wireless device, etc. The customer may set the rules with the host computer 135 to provide that certain transactions receive different receipts. For example, the customer may only want receipts for transactions less than a certain dollar amount displayed on the display screen 130, the customer may want electronic receipts transmitted to a specific destination for receipts over a certain dollar amount, and/or the like. The host computer communication port 132 may be a network connection or the like configured to provide for communications between the processor 120 and the host computer 135.

The host computer 135 may be accessible to the customer, as discussed above, using the receipting system 100. Alternatively, the customer may be able to use other modalities to access the host computer, such as by providing information to an agent associated with the receipting system 100, accessing remote processors provided by a party associated with the receipting system 100, using a personal computer, using a portable device with processing capabilities, including a smart phone etc., and/or the like. Other examples include access by a Blue Tooth or wireless device, or by the Internet. In certain embodiments, the customer may access the host computer 135 using one or more of the different modalities previously described to register with the host computer 135 for the provision of electronic receipting. Registering may include establishing rules with the host computer 135 regarding types of transactions to receive electronic receipting, delivery methods of electronic receipting—i.e., whether to deliver to a phone number, an email address, a portable device and/or the like—the format of the receipt—i.e., Word, excel, pdf, text message, Quicken® format, and/or the like—and/or the like. The customer may also provide an electronic receipting provider, an agent of the electronic receipting provider and/or a person associated with the electronic receipting system 100 with consent in writing and/or the appropriately formatted legal waiver to provide that the customer's credit card number may be communicated electronically. This consent/waiver from the customer may be recorded in the host computer 135 to provide for the communication of the customer's credit card number over the electronic receipting system. Merely by way of example, in the electronic receipting system, the customer's credit card number and/or a portion of the customer's credit card number may be communicated as a part of the electronic receipt. As persons of skill in the art may appreciate, in the electronic receipting system accessible records for transactions may only include the last four digits of the customer's credit card.

In certain embodiments of the present invention, the receipting system 100 may not require input from the input device 125 to provide for different modes of receipting. As discussed above, the customer may establish rules with a host computer 135 that may instruct the processor 120 with the desired receipting for the customer. Alternatively and/or in combination with the host computer 135 control of receipting, in certain embodiments, the customer may interact with the POS device 110 using a card or other portable device, such as a credit card, smart card, mobile phone, or the like. In such interactions, the card or the portable device may include customer instructions regarding receipting. Merely by way of example, the customer may instruct a smart card associated with the customer to provide receipting instructions to the processor 120 via the POS device 110. Again merely by way of example, the smart card may provide instructions to the processor 120 to provide for transmission of an electronic receipt to the smart card.

The processor 120 may be configured to communicate with a transmitting device 140 and/or a printer 150. In some embodiments of the present invention, the processor 120 may receive transaction data from the POS device 110 and input from the customer from the input device 125. Alternatively or in combination with the foregoing, the processor 120 may receive transaction data from the POS device 110 and instructions from a host computer regarding the customers receipting preferences, etc. The processor 120 may process the transaction data in accordance with the customer input to provide an electronic receipt that may be configured for transmission to a destination selected by the customer. Merely by way of example, if the customer requests that the electronic receipt be sent to an email account, the processor 120 may configure the electronic receipt into an email and/or as an email attachment. As another example, if the customer requests that the electronic receipt be sent to a phone number, the processor 120 may configure the electronic receipt for transfer over a telecommunications network, such as by formatting the electronic receipt as a text or instant message. Formats for delivery of the electronic receipt to the customer may be varied and may comprise email in Word format, pdf format, Excel format, straight text, and/or the like. In certain aspects, the electronic receipt may be formatted to provide for interaction with accounting type software or the like. Merely by way of example, the electronic receipt may be provided to the customer in a format for use with Quicken® software. In some cases, the receipts may be transmitted to a third party using a specified format and interface. In this way, a third party could aggregate receipts over a specified time and then forward theses to the customer. The customer could register with such a third party and get accumulated receipts through a standard API.

In some embodiments of the present invention, the customer input from the input device 125 may be processed by the processor 120 and an electronic receipt for the transaction transacted at the POS device 110 may be provided by the processor 120 to a transmitting device 140. The transmitting device 140 may be a connectivity port capable of transmitting the electronic receipt from the processor 120 over a computer network, telecommunications network and/or the like. Merely by way of example, transmitting device 140 may be a computer network port connected, either directly or wirelessly, to a computer network, a telecommunication port connected either directly or wirelessly, to a telecommunication network and/or the like.

In certain aspects, the transmitting device 140 may be a wireless transmitter/receiver, an infrared transmitter/receiver and/or the like. Merely by way of example, in such aspects, the electronic receipt may be encoded onto a radio and/or infrared frequency and transmitted from the transmitting device 140 and picked up by a portable device 145 associated with the customer. The transmitting device may include a port 142 for outputting the encoded electronic receipt. The portable device 145 may comprise a wireless phone, PDA, iPod, specialty portable device with the capability of receiving receipt information transmitted by the transmitting device 140, smart card, and/or the like. Merely by way of example, Blue Tooth technology may be used to provide for transmission of the electronic receipt from the transmitting device 140 to the portable device.

In certain aspects, a docking port 147 may be used to dock a portable device to the transmitting device 140. The docking port 147 may include a connection shoe for connecting the transmitting device to the portable device, an infrared aperture for synchronization with a similar aperture in the portable device, a USB port, a Firewire port and/or the like to provide for a connection between the portable device 145 and the transmitting device 140. A positioning mechanism for correct positioning of the portable device relative to the transmitting device 140 may also be provided. Security systems and methods may be incorporated into the electronic receipting system 100 to provide that only certain portable devices associated with the customer may receive the electronic receipt transmitted by the transmitting device 140. Separately or in combination with the different embodiments for transmitting the electronic receipt, the electronic receipt may be displayed to the customer on the display 130.

The printer 150 may provide for printing of a hard copy of a receipt for the POS transaction in addition to or as an alternative to the transmission of the electronic receipt. In such embodiments, the processor 120 may process the transaction data and provide for printing of the receipt by the printer 150.

Figure 2:
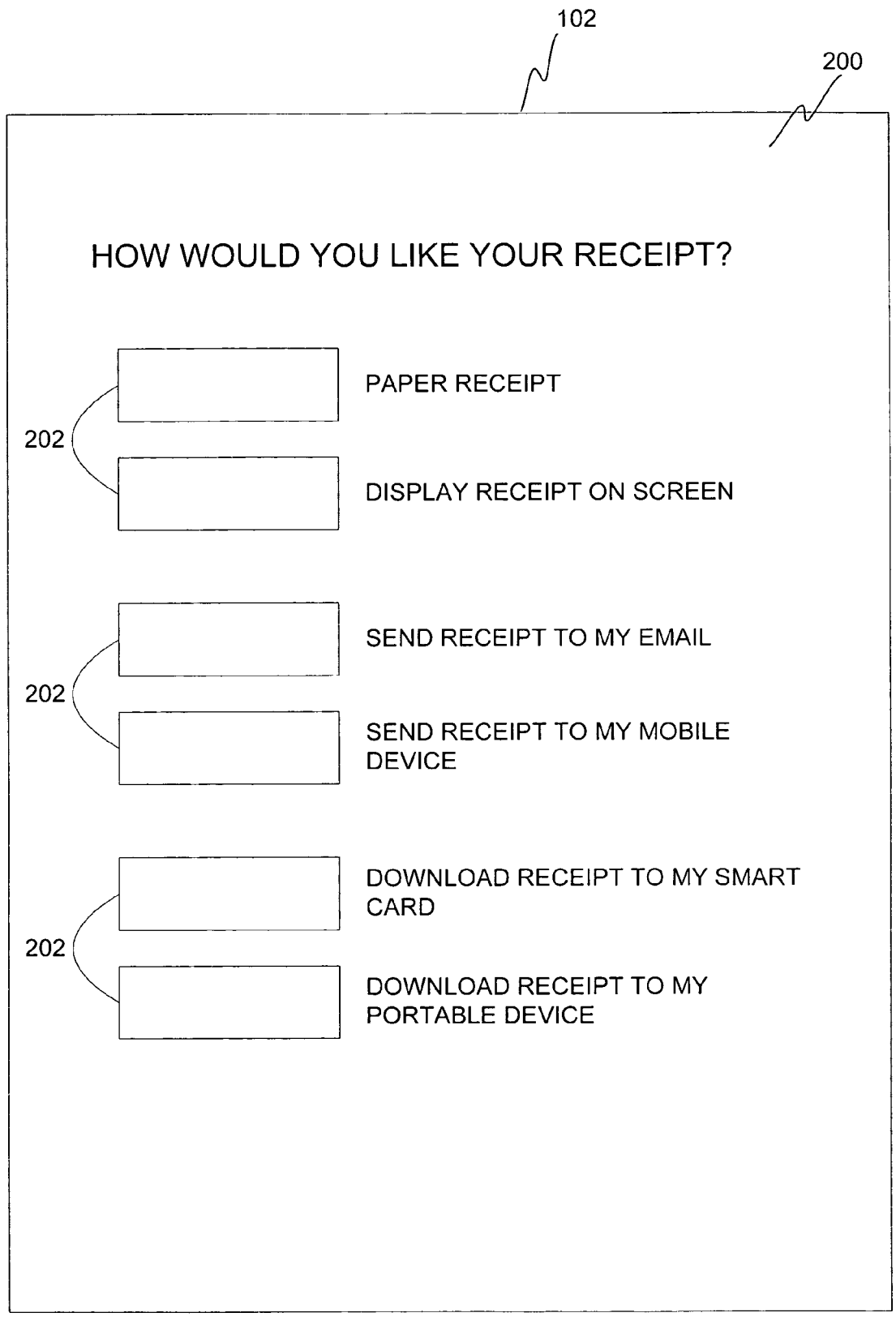
FIG. 2 illustrates a display screen for providing the user with various options for receiving a receipt according to an embodiment of the present invention.

FIG. 2 illustrates one embodiment of a display 200 that may be presented on display screen 130. Display 200 presents the customer with various options for receiving a receipt for a transaction. Associated with each option is an icon 202 that may be touched to select the given option. As an alternative, electronic receipting system 100 could include physical buttons adjacent to display 200 that could be pressed to select the desired option. As a further option, input device 125 could be used.

As shown, the customer may select from options such as receiving a paper receipt that is printed using printer 150, displaying the receipt that is shown on display screen 130, sending the receipt to an e-mail address, sending the receipt to a mobile device, downloading the receipt to a smart card, or downloading the receipt to a portable device. Also, the customer may select any combinations of the above, such as for example, displaying the receipt on the display screen as well as sending the receipt to an email address and/or downloading to a mobile device. Examples of e-mail accounts include those that may be accessed using a personal desk top or laptop computer, a PDA, a mobile phone or the like. The electronic copy of the receipt may be delivered in a variety of formats, such as a pdf document, a Word& document, a spreadsheet, a TIFF image file format, a JPEG or the like. When sending the receipt to a mobile phone, the receipt may be transmitted as an SMS text file, or if the mobile phone includes an operating system such as Windows CE, other formats as described above may be used. When downloading the electronic copy of the receipt, the receipt may be transferred wirelessly—by Blue Tooth, infrared and/or the like—or by a hard connection to the portable device.

Figure 3:
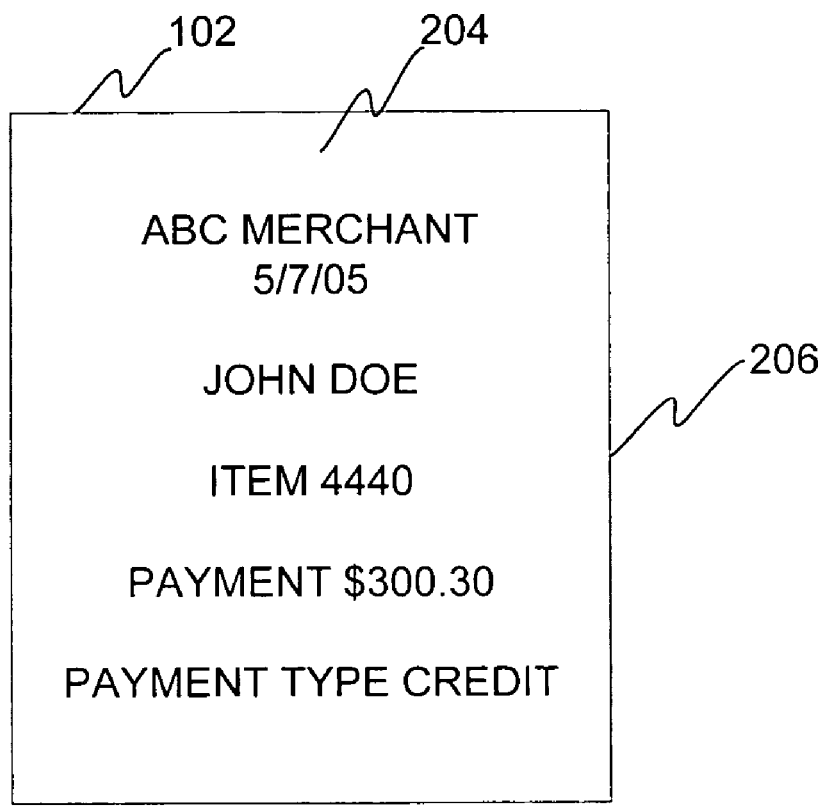
FIG. 3 illustrates a display screen showing a copy of a receipt according to an embodiment of the present invention.

FIG. 3 illustrates an embodiment of a display 204 that may be displayed on the display screen 130 when the customer requests that the receipt by displayed on the display screen 130. Shown is a copy of the receipt 206 showing a purchase made from a merchant using a credit card.

Figure 4:
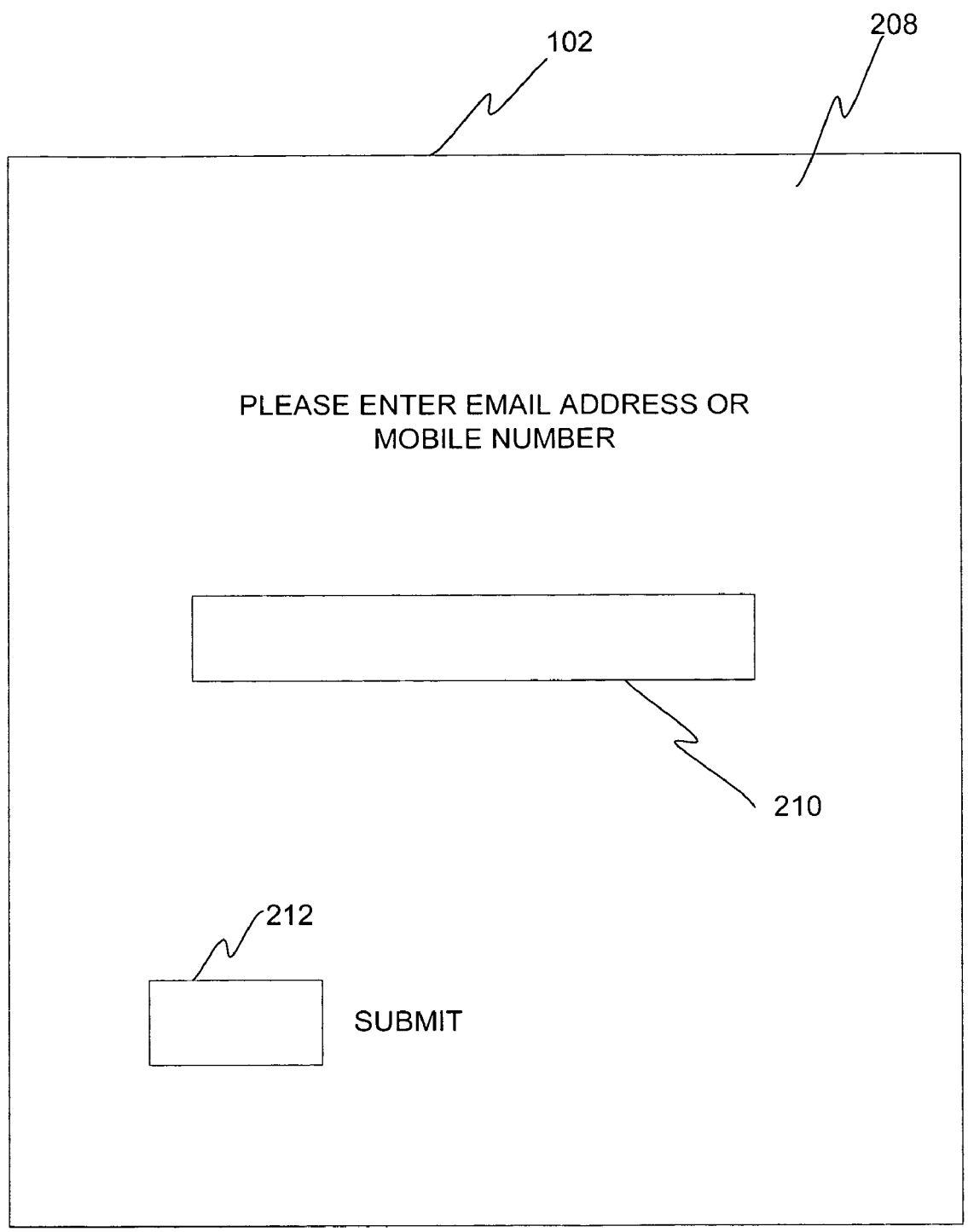
FIG. 4 illustrates a display screen permitting the user to enter an email address or mobile number for delivery of the electronic receipt according to am embodiment of the present invention.

FIG. 4 illustrates a display 208 that may be shown on the display screen 130 when the customer selects an option for an electronic copy of a receipt. Display 208 includes an entry box 210 where the customer may input an email address or a wireless phone number where the electronic copy of the receipt may be transmitted. This information may be input using the input device 125. When ready to send, a submit icon 212 is selected. In one option, the customer could also be presented with another screen that lets the customer select a format in which the customer would like to receive the file. In other aspects, the customer may request downloading of the electronic copy of the receipt to a portable device and the customer may select the submit icon 212 when the customer's portable device is configured to receive the electronic copy of the receipt. In different aspects, the request for transmission/ downloading of the electronic copy of the receipt may be automated and not require customer action, such as when a smart card is used the card may contain a prompt that is passed from the smart card to the POS device 110 to the processor 120 requesting transmission of the electronic copy of the receipt and the destination of the receipt.

Figure 5:
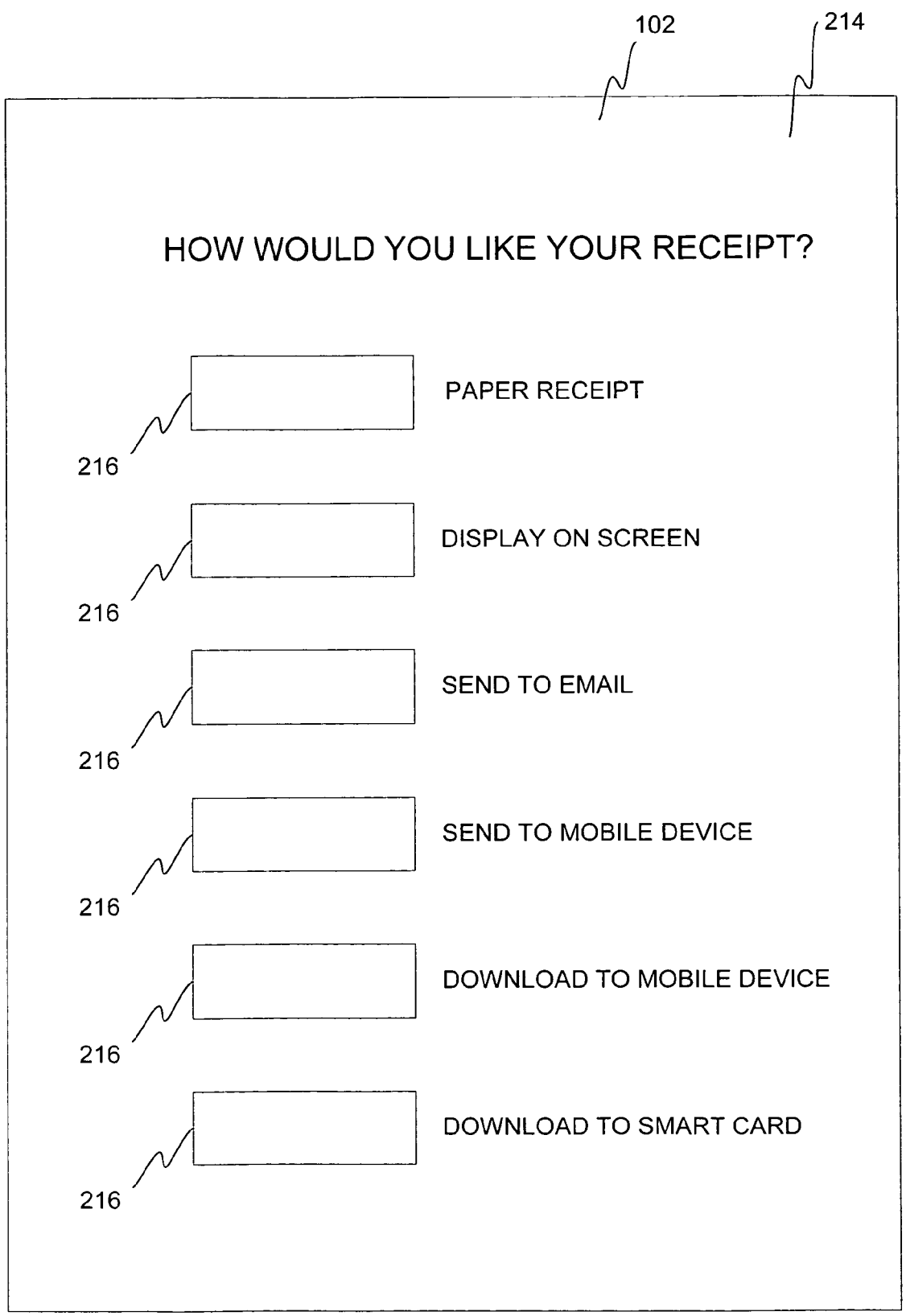
FIG. 5 illustrates a display screen giving the user various options for receiving future receipts according to an embodiment of the present invention.

In some cases, the customer may wish to register a certain option as a default. In this way, the receipt will automatically be sent to the pre-selected option. FIG. 5 shows one embodiment of a display 214 that may be shown on the display screen 130 that permits a customer to register an option. Icons 216 may be pressed or touched to select the desired option. If needed, additional screens may appear to permit the customer to input additional information, such as an email address, mobile phone number, download method or physical address where a receipt could be mailed. Also, in some cases, the customer may be permitted to select more than one option for receiving the receipt. For example, the customer may wish both a printed copy and an electronic copy. Further, in some cases, the customer may be presented with additional options for which the customer is charged a fee, such as when mailing a copy of the receipt.

Figure 6:
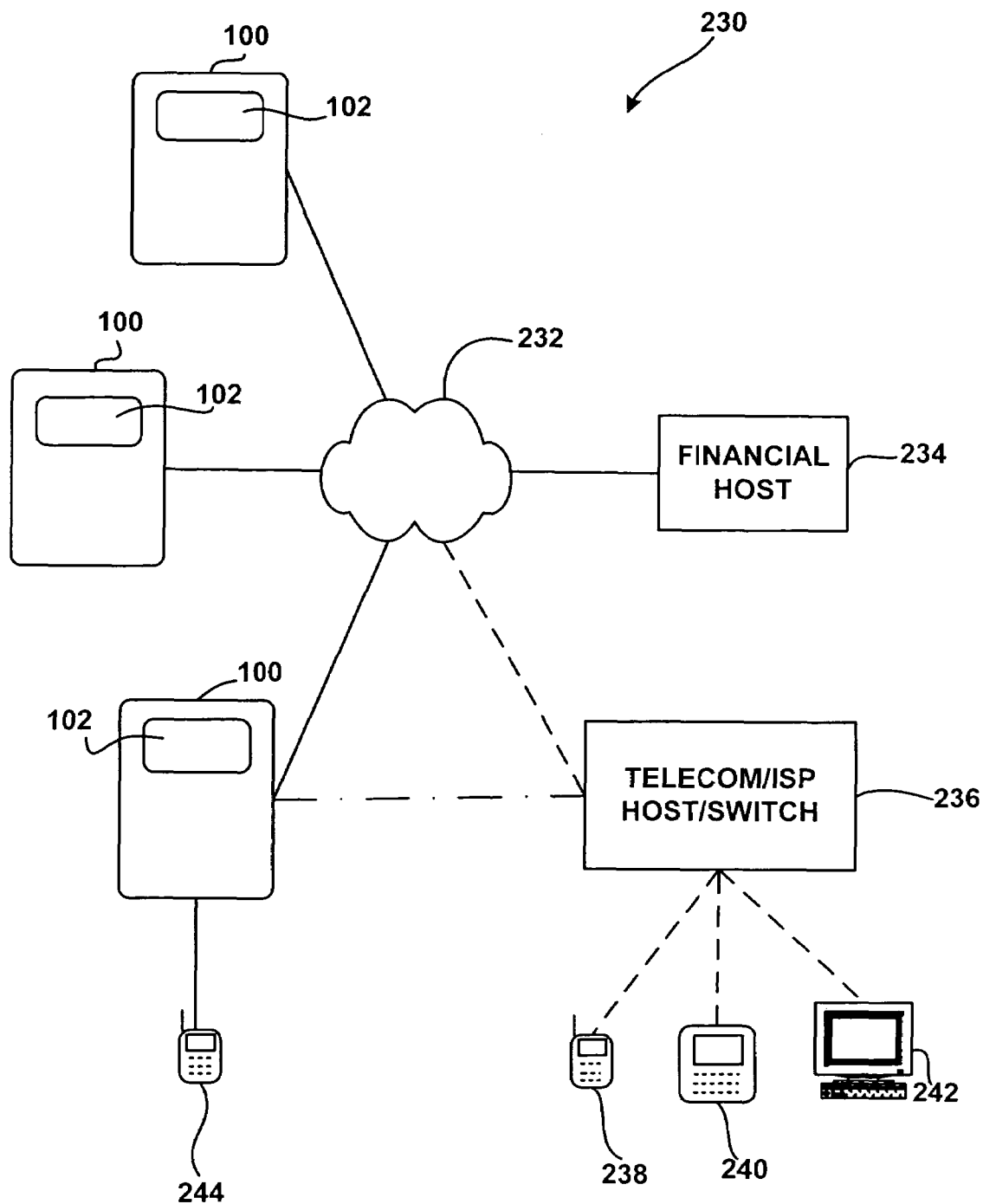
FIG. 6 illustrates a system that may be used to provide a customer with various types of receipts for POS transactions in accordance with an embodiment of the present invention.

FIG. 6 illustrates a system 230 within which one or more electronic receipting systems 100 may be used. The system includes a plurality of the electronic receipting systems 100, each connected to the other in an environment via a network 232. The network 232 may be any of a wide variety of networks, including, for example, a wide area network, a local area network, the Internet, a credit/debit network over which credit and/or debit transactions occur, and the like.

In certain embodiments of the present invention, a financial host 234 may be coupled to the network 232 to provide for the integration of receipting with the transaction of financial transactions by the POS devices associated with the electronic receipting systems. The financial host 234 may include appropriate processors and databases for conducting financial transactions over network 232 as is known in the art. Also coupled to the network 232 and/or the financial host 234 and/or the electronic receipting systems 100 is a telecommunications or Internet service provider host/switch 236. Host/ switch 236 may be used to facilitate communications with a variety of wireless devices. For example, if a customer wishes to receive an electronic copy of a receipt using the electronic receipting system 100, a copy of the electronic receipt may be transmitted to host/switch 236 directly from the electronic receipting system 100 over some type of network, including network 232, or via financial host 234. When host/switch 236 receives the electronic copy of the receipt along with the forwarding information, it may forward it to an appropriate email address, mobile number, or the like. This may also be done over a variety of networks as is known in the art. As one example, if the customer wishes the electronic receipt to be sent as a text message or other message to a mobile phone 238, host/switch 236 may be configured to send the electronic copy to the mobile phone 238 over an appropriate network. Similarly, a PDA or other hand held computer 240 may receive an electronic copy of a receipt from host/switch 236 in a similar manner. Further, if the customer wishes to send the electronic receipt to an email address, this may be accomplished using host/switch 236 that will forward the receipt to a customer's email when using a personal computer 242 or other type of computer capable of receiving and reading emails.

In some cases, the electronic receipting system 100 may be configured to directly transmit an electronic copy of the receipt to a mobile device. For example, as shown in FIG. 6, a mobile phone 244 or other hand held device may directly receive a communication from the electronic receipting system 100 using Blue Tooth technology, IR technology, a USB port and/or the like. In this way, the electronic receipt would not need to be transmitted over network 232 or use host/ switch 236.

Figure 7:
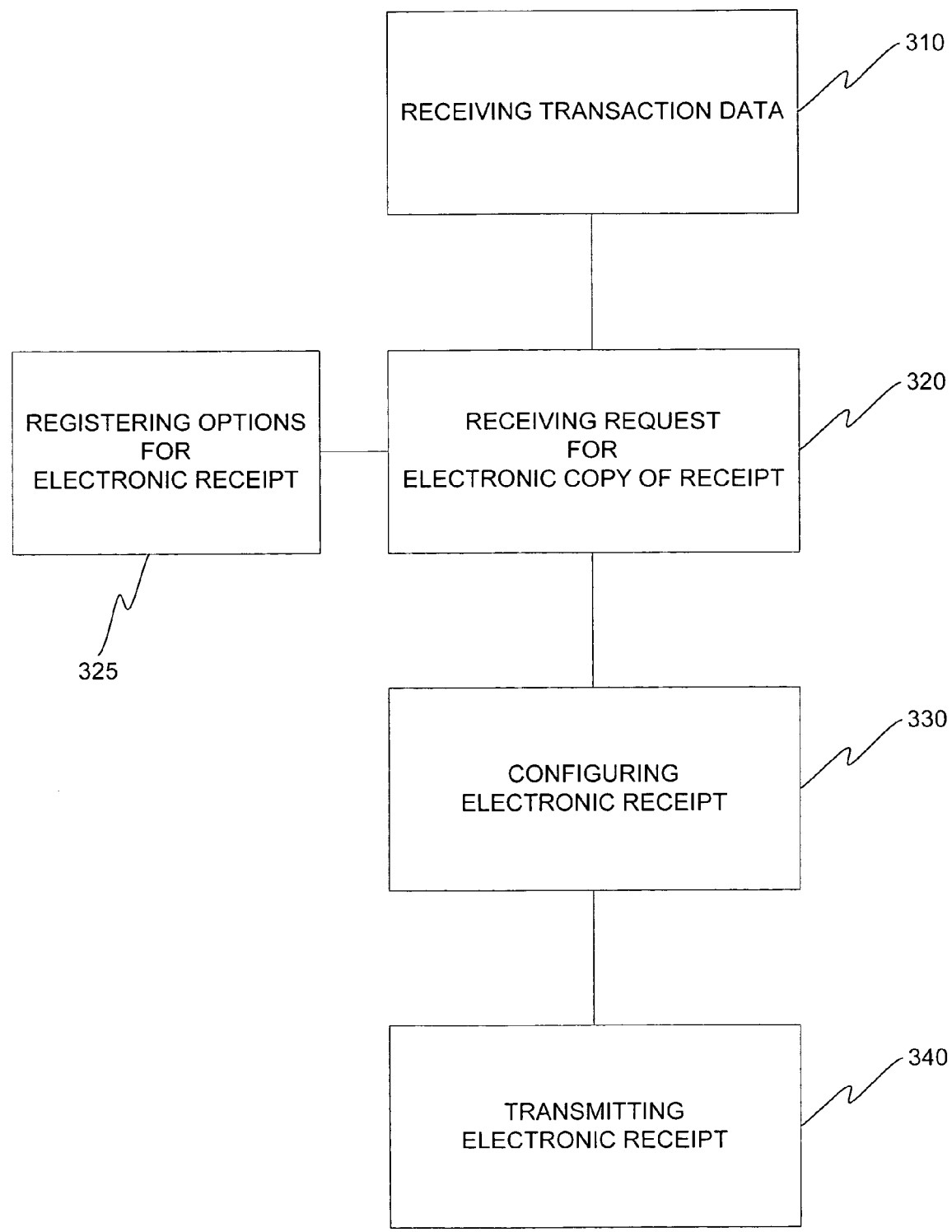
FIG. 7 is a flow diagram providing an overview of the functional hierarchy used in an embodiment of the present invention.

FIG. 7 is a flow diagram providing an overview of the functional hierarchy used in an embodiment of the present invention. In step 310, transaction data concerning a transaction is received from a POS device. In certain embodiments, the transaction data may comprise a receipt for a transaction transacted using the POS device. The transaction data may include such things as sale price, description of good or service sold, payment method, re-stocking number, merchant identification, etc.

In step 320 a request for an electronic receipt for the transaction transacted at the POS device is received. The request for the electronic receipt may be made by a customer to the transactions and/or the like. The request may include a destination for the electronic receipt and may also include a request to display the receipt on a display screen and/or to print a hard copy of the receipt. The request may be made by the customer entering the request into an input device, by a host computer sending a request for an electronic receipt for the transaction, a card used in the transaction, such as a credit card, smart card or the like, containing a prompt to the POS device requesting issuance of an electronic receipt, that may contain destination information, and/or the like.

In step 330 a processor configures the transaction data for delivery according to the request. In some embodiments, the receipt may be received from the POS device in electronic form and may then be configured for delivery to the destination. Merely by way of example, the electronic receipt may be formatted as an email for delivery over a computer network and/or encoded onto radio frequencies for delivery wirelessly to a portable device. In certain embodiments, transaction data may be received from the POS device and this data may be processed into a receipt and configured for delivery to a selected destination or destinations.

In step 340, the electronic receipt is transmitted to the destination or destinations selected by the customer. Transmitting the electronic receipt may require providing the electronic receipt to a network, such as a computer and/or telecommunication network, for transmission to an email account, a web page, an Internet address, a phone number, a data store and/or the like. Transmitting may also involve transmitting infrared frequencies, transmitting radio frequencies, transmitting an electronic signal and/or the like that may be received by a portable device associated with the customer.

In some embodiments of the present invention, a customer may register in step 325 with a financial institution, merchant, service provider or the like, the customer preferences for receipting. These preferences may include a request that certain transactions be electronically receipted and may specify the destination for the electronic receipt. Preferences may specify that only transactions over a certain value be electronically receipted and/or that only transactions for certain goods and/or services be electronically receipted. The preferences may also specify different types of electronic receipting and/or destinations for such receipts for different transactions. In embodiments in which a customer registers his or her preferences, the preferences may be stored on a host computer and provided to an electronic receipting process during the POS transaction. Alternatively, the preferences may be stored on a portable device, such as a smart card, credit card, portable transaction device and/or the like and provided to the POS device during the transaction. In some cases, the preferences can be tied to a loyalty program so that the customer is also able to receive a receipt with loyalty points, rewards, etc. that are earned via the purchase. In such cases, the customer may optionally present a loyalty card at the POS device to provide information as to the loyalty participation.

While the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

Having described several embodiments, it will be recognized by those skilled in the art that various modifications, alternative constructions, and equivalents may be used without departing from the spirit of the invention. Accordingly, the above description should not be taken as limiting the scope of the invention, which is defined in the following claims.

What is claimed is:

1. An electronic receipting system, comprising:
   means for receiving data from a point-of-sale device, wherein:
   the data includes information associated with a transaction, and
   the transaction comprises a dealing between a selling party and a customer for a good and/or a service;
   means for receiving a request for an electronic receipt for the transaction, wherein the means for receiving the request comprises a display screen for displaying selectable prompts for electronic receipting options, wherein the electronic receipting options include at least two of: a display on the display screen, to an email address, to a mobile device, to a smart card and to a portable device, wherein:
   the request includes a destination for the electronic receipt, and
   the destination is associated with the customer;
   means for generating the electronic receipt, wherein:
   the electronic receipt includes payment information associated with the transaction; and
   the means for generating the electronic receipt provides for configuration of the electronic receipt for transmission to the destination;
   means for transmitting the electronic receipt to the destination; and
   means for storing a set of customer-specified rules that govern the generation of electronic receipts, wherein the means for generating the electronic receipt complies with the rules, and wherein under application of the rules different types of receipts are automatically generated for different transactions, and electronic receipts from transactions involving a first kind of goods are sent to a first destination, and electronic receipts from transactions involving a second kind of goods are sent to a second destination.

2. The electronic receipting system as recited in claim 1, wherein the means for receiving the request is further configured to receive options for organizing the data and the type of data to be included in the electronic receipt.

3. The electronic receipting system as recited in claim 2, wherein the options for organizing the data are selected from a group consisting of a date and time of purchase, an order reference number or job number, an account code, a merchant name, a merchant address, a VAT, a tax ID number, a product code, a type of good, a description of goods, a VAT category, a unit price, a quantity, a value of the item, a type of currency, a subtotal, a VAT, and a gross amount.

4. The electronic receipting system as recited in claim 1, further comprising a communications means configured to communicate with a customer device, whereby the customer device is able to negotiate with the receipting system as to the organization and type of data for the receipt.

5. The electronic receipting system as recited in claim 1, further comprising:
   means for dispensing a hard copy receipt to the customer.

6. The electronic receipting system as recited in claim 1, wherein:
   the destination includes an email address; and
   the means for transmitting is configured to transmit the electronic receipt over a computer network to the email address.

7. The electronic receipting system as recited in claim 1, wherein:
   the destination includes a wireless phone, and
   the means for transmitting is configured to transmit the electronic receipt to the wireless phone number.

8. The electronic receipting system as recited in claim 1, wherein:
   the destination includes a portable device; and
   the means for transmitting is configured to transmit the electronic receipt to the portable device.

9. The electronic receipting system as recited in claim 8, wherein the portable device comprises one of a PDA, a wireless phone and a smart card.

10. The electronic receipting system as recited in claim 8, wherein the electronic receipt is transmitted to the portable device as one of an infrared transmission, Blue Tooth, wi-fi, mi-max, and a radio wave transmission.

11. The electronic receipting system as recited in claim 10, wherein the portable device comprises one of a PDA, a wireless phone and a smart card.

12. The electronic receipting system as recited in claim 1, wherein:
   the request for the electronic receipt is received from a portable device associated with the customer; and
   the means for transmitting is configured to transmit the electronic receipt to the portable device.

13. The electronic receipting system of claim 1, wherein under application of the rules, transactions for certain kinds of goods or services are electronically receipted and transactions for other kinds of goods or services are not electronically receipted.

14. The electronic receipting system of claim 1, wherein under application of the rules whether or not a transaction is electronically receipted depends on whether the amount of the transaction exceeds a predetermined monetary threshold.

15. The electronic receipting system of claim 1, wherein the means for storing the customer-specified set of rules comprises a host computer.

16. The electronic receipting system of claim 1, wherein the means for storing the customer-specified set of rules comprises a portable electronic device, and wherein the rules are communicated to the point-of-sale device during the transaction.

17. An electronic receipting system, comprising:
a computer system configured to receive data from a point-of-sale device and to generate an electronic receipt from the received data, wherein:
the data comprises information associated with a transaction between a selling party and a customer;
the transaction is transacted between the selling party and the customer at a location associated with the point-of-sale device; and
the data includes information concerning a payment made by the customer to the selling party for one of a good, a service and a combination of a good and a service;
a display screen in communication with the computer system for displaying selectable prompts for electronic receipting options, wherein the electronic receipting options include at least two of: a display on the display screen, to an email address, to a mobile device, to a smart card and to a portable device;
an input device associated with the computer system and configured to receive a request for issuance of the electronic receipt, wherein the request includes a destination for the electronic receipt;
a communication device that is configured to communicate with the point of sale device and a customer device, the communication device being configured to receive from the customer device a request to revise the organization and type of data for the receipt and to provide the request to the point of sale device; and
a transmitting device associated with the computer system and configured to transmit the electronic receipt to the destination;
and wherein the generation of electronic receipts follows a set of rules previously specified by the customer, and wherein under the rules different types of transactions result in the automatic generation of different types of receipts.

18. The electronic receipting system of claim 17, wherein the input device is further configured to receive options for organizing the data and the type of data to be included in the electronic receipt.

19. The electronic receipting system of claim 18, wherein the options for organizing the data are selected from a group consisting of a date and time of purchase, an order reference number or job number, an account code, a merchant name, a merchant address, a VAT, a tax ID number, a product code, a type of good, a description of goods, a VAT category, a unit price, a quantity, a value of the item, a type of currency, a subtotal, a VAT, and a gross amount.

20. The electronic receipting system of claim 17, further comprising a communications device that is configured to communicate with a customer device, whereby the customer device is able to negotiate with the receipting system as to the organization and type of data for the receipt.

21. The electronic receipting system of claim 17, wherein the computer system further comprises a database with preferences for configuring the receipt, and wherein the input device comprises one of an Internet site and a mobile phone interface.

22. The electronic receipting system recited in claim 17, further comprising:
a printer in communication with the computer system and configured to print a hard copy of a receipt for the transaction.

23. The electronic receipting system as recited in claim 17, wherein the input device comprises one of a keyboard, a touch-screen, a card reader, a scanner, a wireless receiver, a mobile phone, and an infra-red receiver.

24. The electronic receipting system as recited in claim 17, wherein:
the request comprises an email address; and
the transmitting device is configured to send the electronic receipt over a computer network to the email address.

25. The electronic receipting system as recited in claim 17, wherein:
the request comprises a wireless phone, and
the transmitting device is configured to transmit the electronic receipt to the wireless phone.

26. The electronic receipting system as recited in claim 17, wherein the transmitting device comprises one of an infrared transmitter, a Blue Tooth transmitter, a wi-fi transmitter, a wi-max transmitter, and a radio wave transmitter.

27. A method for providing electronic receipting for a transaction transacted at a point-of-sale, the method comprising:
receiving information from a point-of-sale device, wherein:
the information describes a payment made by a customer to a seller at the point-of-sale; and
the point-of-sale device is located at the point-of-sale and is configured to record the payment;
displaying on a display screen of the point of sale device selectable prompts for electronic receipting options, wherein the electronic receipting options include at least two of: a display on the display screen, to an email address, to a mobile device, to a smart card and to a portable device;
receiving a request from the customer to provide an electronic receipt for the transaction, wherein the request includes a destination for the electronic receipt that is selected from the receipting options displayed on the display screen;
using a computer to generate the electronic receipt from the information and to configure the electronic receipt for transmission to the destination;
receiving, from the customer before the transaction, a set of rules that govern the generation of electronic receipts, wherein under the rules different transactions are automatically receipted differently, and electronic receipts from transactions involving a first kind of goods are sent to a first destination, and electronic receipts from transactions involving a second kind of goods are sent to a second destination; and
transmitting the electronic receipt to the destination according to the rules.

28. The method as recited in claim 27, further comprising communicating with the point-of-sale device regarding a request to provide the data in the electronic receipt in a certain format or to provide a certain type of data.

29. The method as recited in claim 28, wherein the communications with the point-of-sale device occurs with a wireless device.

30. The method as recited in claim 29, further comprising providing the wireless device with an acceptance or a denial of the request.

31. The method as recited in claim 28, wherein the type of data is selected from a group consisting of a date and time of purchase, an order reference number or job number, an account code, a merchant name, a merchant address, a VAT, a tax ID number, a product code, a type of good, a description of goods, a VAT category, a unit price, a quantity, a value of the item, a type of currency, a subtotal, a VAT, and a gross amount.

32. The method for providing electronic receipting for the transaction transacted at the point-of-sale as recited in claim 27, the method further comprising printing a hard copy of the electronic receipt for the customer.

33. The method for providing electronic receipting for the transaction transacted at the point-of-sale as recited in claim 27, wherein the destination comprises an email address and the transmitting the electronic receipt comprises transmitting the electronic receipt over a computer network to the email address.

34. The method for providing electronic receipting for the transaction transacted at the point-of-sale as recited in claim 27, wherein the destination comprises a wireless phone and the transmitting the electronic receipt comprises transmitting the electronic receipt over a telecommunication network to the wireless phone.

35. The method for providing electronic receipting for the transaction transacted at the point-of-sale as recited in claim 27, wherein the portable device and the transmitting the electronic receipt comprises transmitting the electronic receipt to the portable device.

36. The method for providing electronic receipting for the transaction transacted at the point-of-sale as recited in claim 27, wherein the electronic receipt is transmitted to the portable device as one of a radio signal and an infrared transmission.

37. The method of claim 27, wherein under the rules, transactions for certain kinds of goods or services are electronically receipted and transactions for other kinds of goods or services are not electronically receipted.

38. The method of claim 27, wherein under the rules, whether or not a transaction is electronically receipted depends on whether the amount of the transaction exceeds a predetermined monetary threshold.

* * * * *